May 16, 1967 YASUO SEGAWA ETAL 3,320,521
DIRECT CURRENT SIGNAL CONTROL DEVICE
Filed June 6, 1963 2 Sheets-Sheet 1
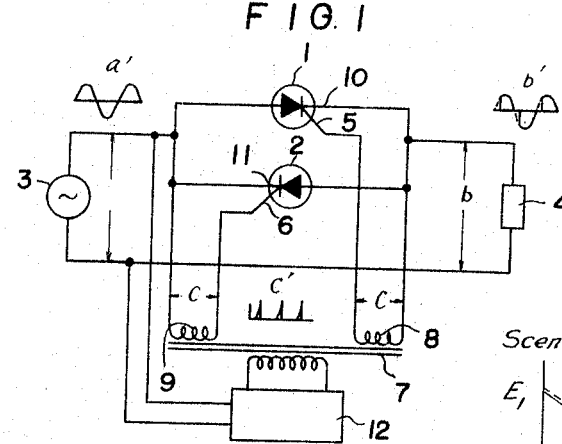
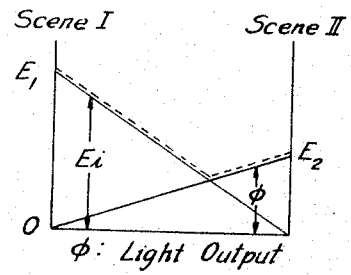
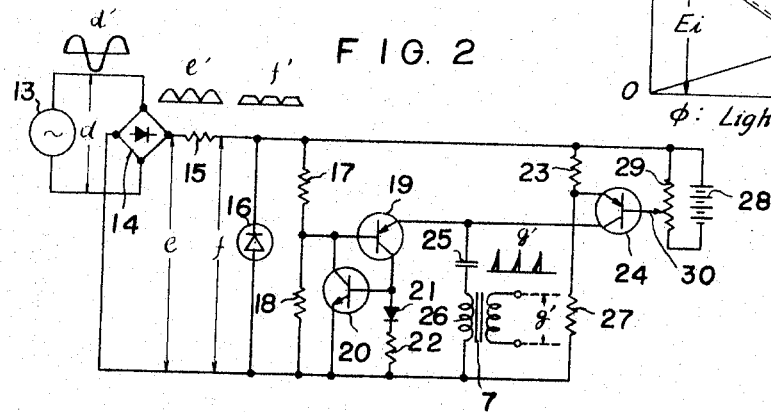
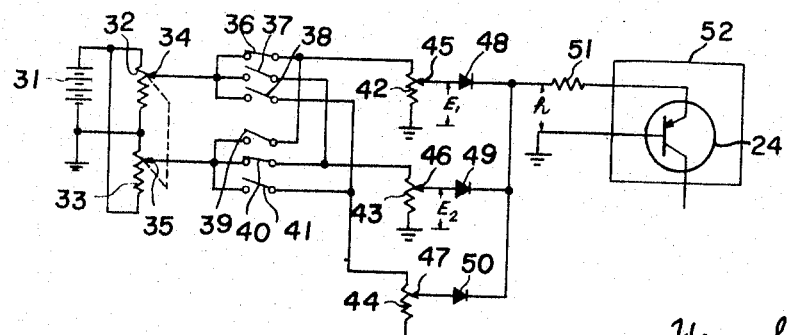

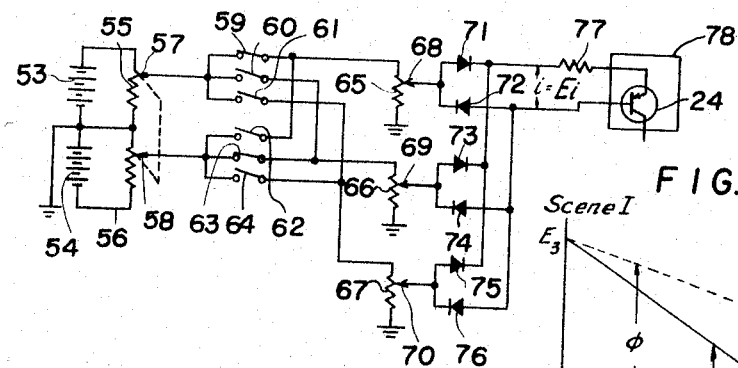
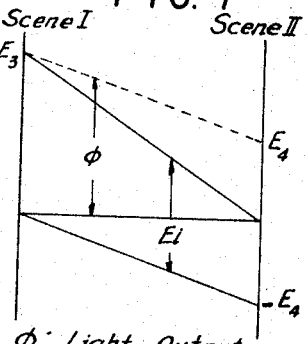
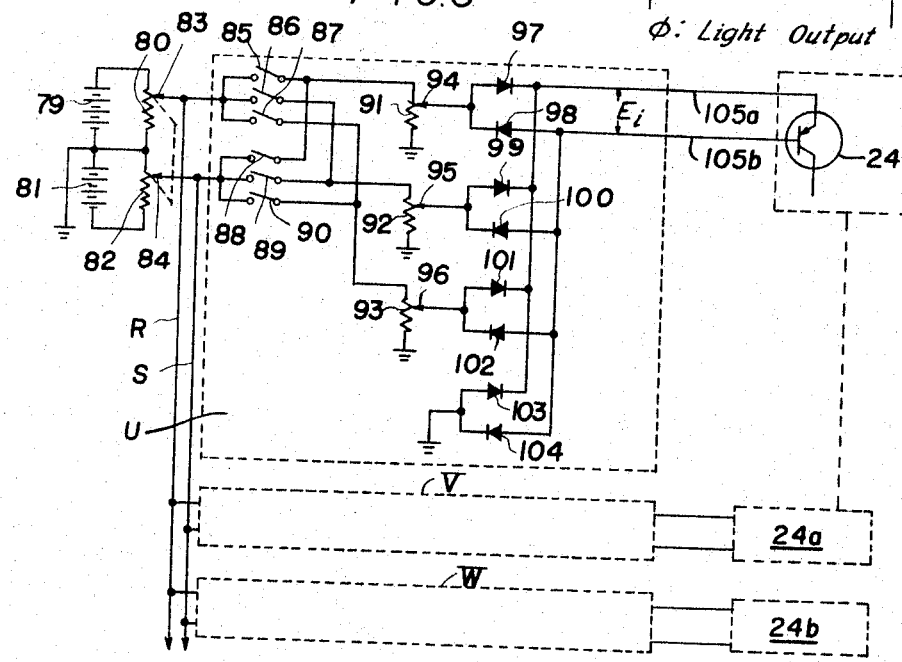

United States Patent Office 3,320,521
Patented May 16, 1967

3,320,521
DIRECT CURRENT SIGNAL CONTROL DEVICE
Yasuo Segawa, Tokyo, and Atsuo Ichikawa, Hodogaya-ku, Yokohama-shi, Japan, assignors to Tokyo Shibaura Electric Co., Ltd., Kawasaki-shi, Japan, a corporation of Japan
Filed June 6, 1963, Ser. No. 285,919
Claims priority, application Japan, June 8, 1962, 37/29,745; Sept. 24, 1962, 37/54,957
3 Claims. (Cl. 323—74)

This invention relates to a control device for effecting smooth control of direct current signal level. Such a device is suitable to control electric valves, for example, thyratrons or silicon controlled rectifiers (or simply SCR) employed in dimmer devices adapted to control illumination of stages or halls, for instance, so that, although not limited thereto, this invention will be described in connection with such application.

In such dimmers, it is usual to control the phase of an electric pulse which is applied to the trigger or gate electrode of an SCR to trigger it so as to vary the current flowing through the filament of a lamp which constitutes the load of said SCR. While the control of the phase of said pulse is usually effected by varying the magnitude of a direct current signal, the control based on such change in the level of the direct current signal is required to be flexible because stage illumination requires complex illumination technique comprising the combination of quick change, gradual change, fade in, fade out, etc., for example.

By the term "quick change" is meant to quickly change the illumination to change the atmosphere of the scenes and by the term "gradual change" is meant to gradually change the illumination to gradually change the atmosphere of the scenes. The terms "fade in" and "fade out" mean, respectively, changes from dark to bright and from bright to dark. However, prior direct current signal control devices used to control such quick and gradual changes were not satisfactory, particularly in effecting gradual change.

Accordingly, it is an object of this invention to provide a new and improved direct current signal control device which can provide smooth gradual change.

Another object of this invention is to provide a novel direct current signal control device which can provide smooth gradual change wherein individual direct current signal levels to be set do not interfere with each other.

A still further object of this invention is to provide a direct current signal control device adapted to preset complicated combinations of various changes of illumination inherent to each scene comprising quick change, gradual change, fade in and fade out, for instance.

Further objects and advantages will be understood from the following description in which a prior device and preferred embodiments of this invention are compared by referring to the accompanying drawings, in which:

FIG. 1 illustrates a connection diagram of a prior art variable current device employing silicon controlled rectifier elements and wave forms helpful to explain the operation thereof;

FIG. 2 illustrates a connection diagram of a pulse generating device to generate pulses used to control said prior art variable current device and wave forms helpful to explain the operation thereof;

FIG. 3 shows a circuit diagram of a prior art direct current signal control device;

FIG. 4 shows a circuit diagram of one example of the direct current signal control device embodying this invention;

FIG. 5 shows a circuit diagram of another embodiment of the direct current signal control device according to this invention; and FIGS. 6 and 7 show graphs for explaining the operation of the circuits shown in FIGS. 3 to 5 inclusive.

Referring now to FIG. 1 of the accompanying drawings there is shown a dimmer employing electric valves, for example, silicon controlled rectifiers, as above described. Such silicon controlled rectifiers are used to vary their load current by applying electric pulses to the trigger electrodes thereof in synchronism with the alternating current voltage of the source and by varying the phase between said alternating current voltage and said pulses. FIG. 1 illustrates one example of a variable current device utilizing silicon controlled rectifiers including a pair of silicon controlled rectifiers 1 and 2, reversely connected in parallel, between one terminal of a source of alternating current 3 and one terminal of a load 4, the other terminal of the source 3 being connected to the other terminal of the load 4. The trigger electrodes 5 and 6 of the silicon controlled rectifiers 1 and 2 are connected to their associated cathode electrodes 10 and 11 respectively through the secondary windings of a transformer 7, the primary winding thereof being connected across the source 3 via a pulse generator 12. Wave forms $a'$, $b'$ and $c'$ shown in FIG. 1 show the operation of portions $a$, $b$ and $c$, respectively.

More particularly, with the source of alternating current 3 connected to the load 4 to energize it with alternating current voltage via a pair of reversely connected silicon controlled rectifiers 1 and 2, until pulses are impressed upon the trigger electrodes 5 and 6, these rectifiers will remain in their nonconductive state so that no current will be supplied to the load.

If now pulses of double frequency are impressed upon the trigger electrodes of the silicon controlled rectifiers 1 and 2 in synchronism with the voltage of the alternating current source from the pulse generator 12 through the secondary windings 8 and 9 of the transformer 7, the silicon controlled rectifiers will become conductive during each positive half cycles, but non-conductive during successive negative half cycles of the alternating current voltage. Thus the silicon controlled rectifiers will alternately become conductive and non-conductive and when supplied with pulses having phases, certain degrees lagging with respect to the laternating current voltage, they will produce a load voltage having a wave form with a portion removed corresponding to said phase lag. Thus the wave form $a'$ supplied across terminals $a$ will be converted into the load voltage at $b$ of the wave form $b'$ with a portion of each half cycle removed by the action of double frequency pulses $c'$ appearing across the secondary terminals $c$ which are lagging with respect to the input wave form $a'$. Thus, the load current can be regulated by varying the phase of the pulses.

The pulse generator which produces said pulses and the direct current signal control device utilized to vary the phase of said pulses will be described hereunder.

Referring now to FIG. 2, there is shown a prior art circuit including a pulse generator and a direct current signal control device wherein a source of alternating current 13 acting also as the source 3 for the load is connected across the input terminals of a full wave rectifying circuit 14, the positive output terminal thereof being connected to the cathode electrode of a Zener diode 16 through a resistor 15. The anode electrode of the Zener diode is connected to the negative terminal of the full wave rectifier circuit, it being understood that the resistor 13 and the Zener diode 16 constitute a clipping circuit to clip off the peaks of the wave form. Further, as shown in the drawing, the Zener diode 16 is connected in parallel with serially connected resistors 17 and 18 with their junction connected to the base electrode of a pnp transistor 19 and to the collector electrode of an npn transistor 20. The collector electrode of the transistor 19 is connected to the negative terminal of the full wave rectifier circuit 14 through a forwardly connected diode 21 and a resistor 22. The base electrode of the transistor 20 is connected to the collector electrode of the transistor 19, whereas the emitter electrode of the former is connected to the negative terminal of the full wave rectifier circuit. Thus, it will be understood that these resistors 17, 18 and 22, transistors 19 and 20 and the diode 21 comprise a switching circuit. Across the Zener diode 16 is connected a series combination comprising a resistor 23, emitter and collector electrodes of a pnp transistor 24, a condenser 25 and the primary winding 26 of the transformer 7. The junction between the collector electrode of the transistor 24 and the condenser 25 is connected to the emitter electrode of the transistor 19, while the junction between the emitter electrode of the transistor 24 and the resistor 23 is connected to the anode electrode of the Zener diode 16 or the negative terminal of the full wave rectifier circuit 14 through a resistor 27. A source of direct current 28 having a parallel connected variable resistor 29 is provided to supply the base current to the transistor 24. The positive terminal of the direct current source 28 is connected to the emitter electrode of the transistor 24 via the resistor 23, while the negative terminal to the base electrode of the same transistor through the variable tap or terminal 30 of the variable resistor 29. As will be understood to those skilled in the art the direct current source 28 and the variable resistor 29 constitute a simple direct current signal control circuit. Various wave forms $d'$, $e'$, $f'$, and $g'$ represent the wave forms at corresponding portions $d$, $e$, $f$ and $g$ of the circuit shown.

More particularly, the alternating current voltage impressed across terminals $d$ of the full wave rectifier circuit 14 in the form of $d'$ will appear at the output terminals $e$ as a full wave rectified voltage of the wave form $e'$. As mentioned above since the resistor 15 and the Zener diode 16 constitute a clipper circuit, a rectangular wave $f'$ is obtained across the terminals of the Zener diode which is corresponding to the full wave rectified voltage with the peak clipped off. Thus the magnitude of the clipped voltage is determined by proper selection of the Zener voltage of the Zener diode. The frequency of the rectangular voltage wave is twice that of the alternating current voltage.

The resistance between the collector and emitter electrodes of the transistor 25 which is included in series with the condenser 25 acts to determine the time constant of this series circuit so that this time constant can be changed by varying the base current of the transistor 24. When the rectangular voltage is impressed upon a series circuit including resistors 23 and 27, a voltage divided by said resistors 23 and 27 will be applied to a circuit including the resistance between the collector and emitter electrodes of the transistor 24, the condenser 25 and the primary winding 26 of the transformer 7 so as to charge the condenser 25. As the condenser is charged up, the emitter potential of the transistor 19 which comprises the switching circuit will be increased in the positive direction to render conductive the transistor 19. This will cause the condenser 25 to initiate to discharge to provide a discharge current through the resistane between collector and emitter electrodes of the transistor 19, through the diode 21, resistor 22, primary winding 26 of the transformer and through the condenser 25.

It will be understood that the purpose of the diode 21 is to prevent the reverse current from flowing through the primary winding 26 and that the transistor 20 is used for effecting stabilizing function. Thus when a potential difference is produced owing to the conduction of the transistor 19, the potential of the base electrode of the transistor 20 will become positive to render it conductive which in turn bring the base of the transistor 19 to a negative potential sufficient to assure stable operation of the transistor 19.

As the terminal voltage of the condenser 25 decreases below a certain value due to discharge the transistor 19 will be rendered non-conductive. As a result the discharge current is interrupted to turn off the transistor 20. Thus, a pulse of the wave form $g'$ will be produced across the secondary side $g$ of the transformer 7 while this pulse is repeatedly produced during one rectangular wave shaped voltage at a time constant determined by the resistor between the collector and emitter electrodes of the transistor 24 and the capacitance of the condenser 25, the pulse that operates the controlled silicon rectifiers is the first pulse. Accordingly, by properly varying the base current of the transistor 24, or by controlling the time constant the phases of the rectangular wave voltage and the pulse can be determined to any value. Variations in the base current of the transistor may be effected by varying the potential across the base and emitter electrodes thereof. Thus the direct current source 28 and the variable resistance comprise one example of a direct current signal control device for this purpose.

Adjustment of the variable tap 30 along the variable resistance 29 is effective to vary the base potential of the base and hence the base current to control the silicon controlled rectifiers, thus varying the load current thereof. However, since the above described direct current signal control device can not provide such complicated illumination techniques as changes of scenes of stages including rapid change, gradually change and the like, for example, a circuit as shown in FIG. 3 has been used to effect rapid as well as gradual changes.

In FIG. 3, a pair of variable resistors 32 and 33 are connected in parallel with a source of direct current. To each of the slidable terminals 34 and 35 is connected one terminal of two groups of electric contacts 36, 37 and 38 and 39, 40 and 41 while on the opposite side corresponding contact pairs 36 and 39, 37 and 40, and 38 and 41 are connected together. Terminals of each pair are connected to one end of variable resistors 42, 43 and 44, respectively adapted to set levels. The opposite terminal of these variable resistors are connected to the negative pole of said direct current source 31. The sliding terminals 45, 46 and 47 associated with the variable resistors are respectively connected to the anode electrodes of rectifying elements, for instance diodes 48, 49 and 50, the negative sides thereof being connected together and then connected to one input terminal of a controlled member 52 via resistor 51. Control member 51 includes a transistor 24, the emitter of which is connected to resistor 51. The opposite input terminal of the controlled member 52 is connected to the negative pole of the direct current source 31.

While the above described circuit can provide quick and gradual changing operations by switching between contacts, it has such defects as mentioned below in providing gradual changing operation.

More particularly, it is assumed now that the set voltage at terminals $h$ for scenes I and II be $E_1$ and $E_2$ and that these voltages $E_1$ and $E_2$ are set by means of variable resistors 42 and 43 for establishing the level. At first contacts 36 and 40 are closed, and thereafter slidable terminals 34 and 35 are moved in unison along the variable resistors 32 and 33. In this case it should be understood that the sliding terminal 34 is to be moved from the positive pole side to the negative pole side of the direct current source 31 whereas the sliding terminal 35 is from the negative pole side to the positive pole side. As a result, the voltage appearing across the input terminal $h$ will be varied from $E_1$ to $E_2$ as shown by dotted lines in FIG. 6 as the sliding contact is moved. However, the input voltage becomes lower than the set voltages $E_1$ and $E_2$ during said process of varying the set voltages so that gradual change is not effected smoothly which is detrimental to dimming.

As shown in FIG. 4 in accordance with one embodiment of this invention, a pair of direct current sources 53 and 54 are connected in series and a pair of serially connected variable resistors 55 and 56 are connected across said serially connected sources with their junctions interconnected and grounded. To the sliding terminals 57 and 58 of these variable resistors are respectively connected one terminal of two groups of contacts 59, 60 and 61, and 62, 63 and 64. On the opposite end, corresponding pairs of contacts are interconnected and each of the contact pairs is respectively connected to one end of variable resistors 65, 66 and 67 for setting levels, the other end of these resistors being connected to the junction between said direct current sources 53 and 54. To each of the sliding terminals 68, 69 and 70 associated with said variable resistors is respectively connected a pair of rectifier elements 71, 72; 73, 74 and 75 and 76 which are reversely poled with respect to each other. The opposite terminals of the rectifier elements of one polarity are connected together and thence to one terminal of a controlled member 78 via a resistor 77 while the terminals of the rectifier elements of the opposite polarity are directly connected to the other terminal of the controlled member 78.

While the sliding terminals 57 and 58 of the first and second variable resistors 55 and 56 are moved independently to vary the voltage they are moved in unison to provide the gradual changing operation. Contact groups 59, 60 and 61 and 62, 63 and 64 are changed over to control rapid and gradual changes. Level setting variable resistors 65, 66 and 67 are employed to preset the condition of illumination for a given scene to provide the required voltage across terminals $i$. Various rectifier elements 71, 72, 73, 74, 75 and 76 act to always impress a unidirectional voltage across the terminals $i$ while at the same time permitting the setting of the voltage provided by one of the variable resistors, for example 65, independently of the other variable resistors 66 and 67. The purpose of the resistor 77 is to increase the impedance at the end $i$ so as to prevent the effect upon the set voltage at the end $i$ caused by the movement of the slidble terminals 68, 69 and 70 along variable resistors 65, 66 and 67. Where the input impedance of the controlled member itself is high, the resistor 77 may be omitted. The controlled member 78 may include one or more pulse generators which are connected to SCR variable current device, and has its input terminals connected across the base and emitter electrodes of the transistor 24 shown in FIG. 4. The number of the circuits comprising the second variable resistor and two rectifying elements, for example, the variable resistor 65 and the rectifying elements 71 and 72 is not required to be limited to three sets as shown but may be increased to any desired number.

Gradually changing operation, for example, gradual change of the scenes of a stage will now be considered, although control of rapid changing operation can also be provided by the described device of this invention.

At first respective level setting variable resistors 65 and 66 are adjusted so as to provide the positive voltage $E_3$ for the scene I as well as the positive voltage $E_4$ for the scene II across the input terminals $i$. Thereafter the contacts 59 and 63 are closed and the slidable terminal 57 of the first variable resistor 55 is moved from the positive pole side to the negative pole side of the direct current source 53 while at the same time to move the slidable terminal 58 of the first variable resistor 56 from the positive pole side to the negative pole side of the direct current source 54. It is advantageous to select the same voltage value for both direct current sources.

As shown in FIG. 7 by grounding the junction between direct current sources 53 and 54, the terminal voltage of the level setting variable resistor for the scene I will be varied from $E_3$ to zero while the terminal voltage of the variable resistor 66 adapted to set the scene II from zero to $-E_4$ as the slidable terminals 57 and 58 are moved.

Since rectifier elements 71, 72, 73 and 74 are connected in a bridge circuit, the voltage appearing across the input terminals $i$ is always maintained unidirectional and smoothly changed from $E_3$ to $E_4$ as shown by the dotted line of FIG. 7. Other transfer operations of the scenes, for example rapid change, may be provided by closing the contact 59 to establish a voltage $E_1'$ across the input terminals $i$ and thereafter opening the contact 59 and closing the contact 60. Thus, the set voltage at the input terminals $i$ will be changed to the voltage $E_4$.

Thus the above described embodiment of this invention can effect smooth change of the atmosphere of the scenes, more particularly gradual change thereof whereby improving the effect of illumination for stages, television studio halls and the like.

In FIG. 5 there is shown a modification of this invention comprising a first source of direct current 79 connected in parallel with a first variable resistor 80 and a second source of direct current 81 which is connected in series with said first source 79 and in parallel with a second variable resistor 82. As shown, a first D.C. bus R is connected to the slidable terminal 83 of the first variable resistance 80 to receive its output voltage whereas a second D.C. bus S is connected to the slidable terminal 84 of the second variable resistor 82 to receive its output voltage. These D.C. busses R and S are connected to the input ends of control circuits $u$, $v$ and $w$ which are usually provided in multiple to supply the sum of the output voltages supplied to the respective busses R and S to the input ends of the control circuits $u$, $v$ and $W$.

Inasmuch as the various control circuits $u$, $v$ and $w$ have the identical construction, only the control circuit $u$ will be described in detail as follows. Thus, one end of this control circuit includes one ends of two pairs of contacts 85, 86, 87 and 88, 89, 90 adapted to selectively receive the direct current signal voltage from said busses R and S. The other side of these contacts are interconnected to form corresponding pairs which are connected to one ends of variable resistors for presetting the level of the direct current signals, the other ends of these variable resistors being connected to the junction between said sources of direct current 79 and 81. Each of the slidable terminals 94, 95 and 96 associated with the variable resistors 91, 92 and 93 is respectively connected to each pair of rectifier elements 97, 98, 99, 100 and 101, 102, which are connected in parallel but in opposite polarities. All cathode electrodes of the rectifier elements are commonly connected to the cathode electrode of a rectifier element 103 while all anode electrodes to the anode electrode of a rectifier element 104. The opposite terminals of the rectifier elements 103 and 104 are connected to said common junction between direct current sources 79 and 81. One output terminal 105$a$ of the control circuit $u$ is connected to the cathode electrodes of the rectifier elements 97, 99, 101 and 103, from the emitter of PNP transistor 24 while the other output terminal 105$b$ leads from the base of transistor 24 to the anode electrodes of the rectifier elements 98, 100, 102 and 104 circuits $v$ and $w$ also include a similar control arrangement with transistors 24$a$ and 24$b$.

In order to effect gradual change of a direct current voltage by the device shown in FIG. 5, one of the level setting variable resistor 91 is adjusted to produce positive voltage $E_3$ and the other level setting variable resistor 92 to produce positive voltage $E_4$. For gradually changing from the voltage $E_3$ to $E_4$, contacts 85 and 89 are closed and then the slidable terminals 83 and 84 are moved in unison along the first and second variable resistors 80 and 82 from the positive pole side to the negative pole side.

The positive current supplied from the slidable terminal 83 will flow from the first D.C. bus R through the contact 85 and the level setting variable resistor 91 and the positive voltage $E_3$ established by the variable resistor 91 will be applied across output circuits 105a and 105b through the slidable terminal 94, the rectifier elements 97 and 104. Since the rectifier element 104 operates to short circuit other level setting variable resistors 92 and 93 the positive voltage $E_3$ would not be affected by the value of these resistors.

On the other hand, the negative current from the slidable terminal 84 will flow from the second D.C. bus S through the contact 89 and the level setting variable resistor 95 and the negative voltage $E_4$ produced by said resistor 95 will be impressed across the output circuits 105a and 105b via the slidable terminal 95 and the rectifier elements. Like the rectifier element 104 the rectifier elements 103 operates to short circuit the variable resistors 91 and 93 to protect the set voltage $E_4$ produced by the variable resistor 92 against the action of variable resistors 91 and 93.

FIG. 7 shows the resultant voltage of $E_3$ (positive) and $E_4$ (negaive). By maintaining the potential of the junction between direct current sources 79 and 81 at zero potential, as the slidable terminals 83 and 84 are moved in unison, the set voltage of the variable resistor 91 will vary linearly from the positive $E_3$ to zero while at the same time the set voltage of the variable resistor 92 will vary linearly from zero to negative $E_4$. As a result the sum of the absolute values of both voltages will be applied across output circuits 105a and 105b, which varies linearly from positive $E_3$ to positive $E_4$ as shown by the dotted lines in FIG. 7.

Rapid change in the direct current voltage can be accomplished by selective operation of contacts 85, 86, 87, 88, 89 and 90. Thus, for example, when the slidable terminals 83 and 84 are brought to the positive pole of the direct current sources 79 and 81, variable resistors 91 and 92 are respectively set to voltages $E_3$ and $E_4$, and when the contact 85 is closed and then changed over to the contact 86, then the set voltage will be changed from $E_3$ to $E_4$ thus effecting rapid change of the level. On the contrary, when it is desired to rapidly decrease the level to zero said contacts are opened instead of being closed as described in the preceding paragraph. Further in order to gradually change the level from zero to the set voltage (fade in) or vice versa (fade out), the slidable terminals 83 or 84 is operated independently.

While above description refers to the control circuit, it should be understood that other control circuits have identical construction and operation and that any desired number of level setting variable resistors may be provided.

Thus, according to the modification of this invention the level of direct current signals can be smoothly and gradually changed. Moreover the level can be maintained more stably when compared to the embodiment shown in FIG. 4 since provision of short circuiting rectifier elements 103 and 104 eliminates the effect caused by the magnitude of other level setting resistors.

While this invention has been described with reference to preferred embodiments thereof it will be understood that this invention is not limited thereto, but may be carried out in various ways without departing from the true spirit and scope of the invention. Thus, for instance any designed number of contacts, level setting variable resistors and control circuits including these elements may be used. Moreover this invention can be used to any applications other than illumination control.

What is claimed is:

1. A direct current signal control device comprising a source of electric power including a first source of direct current, a first variable resistor with sliding terminal connected in parallel with said first source of electric power, a second source of direct current connected in series with said first source of direct current, and a second variable resistor with a sliding terminal connected in parallel with said second source of direct current; a plurality of groups of contacts, each connected to the slidable terminals of said first and second variable resistors, respectively, to obtain the output voltage of said source of electric power, corresponding contacts in each of said groups being connected together to form pairs, a plurality of level setting variable resistors each having a slidable terminal and connected to one of said contact pairs to selectively receive voltage therefrom, a plurality of pairs of rectifier elements connected in opposite polarities, each connected to a corresponding slidable terminal of said level setting variable resistor, means to connect said rectifier elements of one polarity to one output terminal and means to connect said rectifier elements of the opposite polarity to the other output terminal.

2. A direct current signal control device comprising a source of electric power including a first source of direct current, a first variable resistor connected in parallel with said first source of direct current and having a slidable terminal, a second source of direct current connected in series with said first source of direct current across a common connection and a second variable resistor connected in parallel with said second source of direct current and having a slidable terminal; a plurality of direct current busses each connected to one of said slidable terminals to obtain the output voltage from said source of electric power, and a plurality of control circuits, each connected across said busses to receive said output voltage therefrom, each of said control circuits comprising a plurality of electric contacts arranged to selectively obtain the voltage of said direct current busses, a plurality of level setting resistors each including a slidable terminal and connected to said electric contacts to selectively receive said output voltage, and a plurality of pairs of rectifier elements of opposite polarities each connected to the corresponding one of said slidable terminals of said level setting resistors, the opposite ends of said rectifier elements being grouped according to their polarity and connected to output terminals.

3. The direct current signal control device according to claim 2 wherein plurality of pairs of rectifier elements of opposite polarities are provided, one end of each of said pairs of rectifier elements is connected to a corresponding one of said slidable terminals of said level setting viariable resistors, the opposite ends of said rectifier elements are grouped according to their polarity to provide output terminals, and two short circuiting rectifier elements are provided each connected between one output terminal of one polarity and the common connection between said first and second sources of direct current.

References Cited by the Examiner
UNITED STATES PATENTS 3,264,551  8/1966  Segawa _____ 307—98

ORIS L. RADER, *Primary Examiner.*

T. J. MADDEN, *Assistant Examiner.*